(12) United States Patent
Berkman et al.

(10) Patent No.: US 7,140,390 B2
(45) Date of Patent: Nov. 28, 2006

(54) FROST FREE VALVE ASSEMBLY

(75) Inventors: Peter Berkman, Highland Park, IL (US); Shi James Li, Granger, IN (US)

(73) Assignee: B&K Industries, Inc., Elk Grove Village, IL (US)

( * ) Notice: Subject to any disclaimer, the term of this patent is extended or adjusted under 35 U.S.C. 154(b) by 0 days.

(21) Appl. No.: 11/049,218

(22) Filed: Feb. 2, 2005

(65) Prior Publication Data

US 2005/0126645 A1 Jun. 16, 2005

Related U.S. Application Data

(63) Continuation-in-part of application No. 10/631,372, filed on Jul. 31, 2003, now Pat. No. 6,880,573.

(51) Int. Cl.
*F16K 15/18* (2006.01)
(52) U.S. Cl. .............. 137/614.2; 137/454.6; 137/360
(58) Field of Classification Search .......... 137/454.5, 137/454.6, 614.2, 301, 302, 304, 360
See application file for complete search history.

(56) References Cited

U.S. PATENT DOCUMENTS

| | | | |
|---|---|---|---|
| 4,844,116 A | 7/1989 | Buehler | |
| 4,909,270 A | 3/1990 | Enterante, Sr. et al. | |
| 4,971,102 A * | 11/1990 | Orlandi | 137/454.6 |
| 5,022,429 A | 6/1991 | Rollini et al. | |
| 5,392,805 A * | 2/1995 | Chrysler | 137/360 |
| 5,632,303 A | 5/1997 | Almasy et al. | |
| 5,996,614 A * | 12/1999 | Ashton | 137/454.6 |
| 6,142,172 A | 11/2000 | Shuler et al. | |
| 6,929,029 B1 * | 8/2005 | Chung | 137/614.2 |
| 2005/0161087 A1 * | 7/2005 | Brattoli et al. | 137/360 |

* cited by examiner

*Primary Examiner*—Kevin Lee
(74) *Attorney, Agent, or Firm*—Harness, Dickey & Pierce, P.L.C.

(57) ABSTRACT

A frost free faucet having a spigot assembly including a drain conduit, a sleeve assembly including an elongated pipe, and a valve assembly. The valve assembly including a ¼ turn valve and a check valve. The ¼ turn valve includes a rotatable disc with an inlet and a stationary disc with a through hole. Each disc is formed of a ceramic material, wherein upon turning the rotatable disc 90 degrees in a first direction the inlet and the through-hole align to an open position and upon turning the rotatable disc 90 degrees in a second direction, the inlet and the through-hole misalign to a closed position.

17 Claims, 10 Drawing Sheets

FROST FREE VALVE ASSEMBLY

CROSS-REFERENCE TO RELATED APPLICATIONS

This application is a continuation-in-part of U.S. patent application Ser. No. 10/631,372 filed on Jul. 31, 2003 now U.S. Pat. No. 6,880,573. The disclosure of the above application is incorporated herein by reference.

FIELD OF THE INVENTION

The present invention relates to a valve assembly for use in residential or commercial plumbing systems. More particularly, the present invention relates to a frost free valve assembly that includes a ¼ turn valve.

BACKGROUND OF THE INVENTION

Frost free faucets have long been in existence. These faucets characteristically have a shut-off valve located in the end of an elongated pipe or sleeve located within the wall or a warmer interior area of the building of which the wall is a part. This shut-off valve is operated by an elongated rod connected to an exterior handle. The frost free characteristics of the faucet are caused by the shut-off valve shutting off the flow of water at a point within the wall or building with the residual water in the elongated pipe flowing by gravity outwardly through the conventional outlet drain of the faucet. In this manner, the valve may be used in sub-freezing climates without requiring seasonal draining.

Conventional frost free faucets, however, utilize a valve design that is subject to deterioration during the lifetime of the faucet due to water impurities. The deterioration of the valve subjects the frost free faucet to backflow and leaks, which are undesirable. Furthermore, these conventional valve designs use of a multi-turn operation that is tiresome to operate.

It is desirable, therefore, to provide a frost free faucet that has an improved valve design. More particularly, it is desirable to provide a simple yet sophisticated valve design that enable an increased longevity, while maintaining sufficient backflow prevention. Furthermore, it is desirable to provide a valve design that allows ease of use.

SUMMARY OF THE INVENTION

With the above desirability in mind, the present invention provides a frost free faucet comprising a spigot assembly, a sleeve assembly including an elongated pipe, and a valve assembly. The valve assembly includes a ¼ turn valve, a check valve and a pressure relief mechanism. The ¼ turn valve includes a rotatable element with an inlet and a stationary element with a through hole. In a preferred embodiment, the rotatable element is butterfly-shaped having a pair of inlets and the stationary element is a disc shaped having a pair of through-holes. Each disc of the ¼ turn valve is formed of a ceramic material, wherein upon turning the rotatable element 90 degrees in a first direction, the inlet and the through-hole are aligned to an open position and upon turning the rotatable element 90 degrees in a second direction, the inlet and the through-hole are misaligned to a closed position. The check valve is located upstream of the ¼ turn valve to prevent the backflow of water from the spigot to the supply line. The pressure relief mechanism allows water trapped downstream of the valve assembly to be discharged from the valve assembly.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
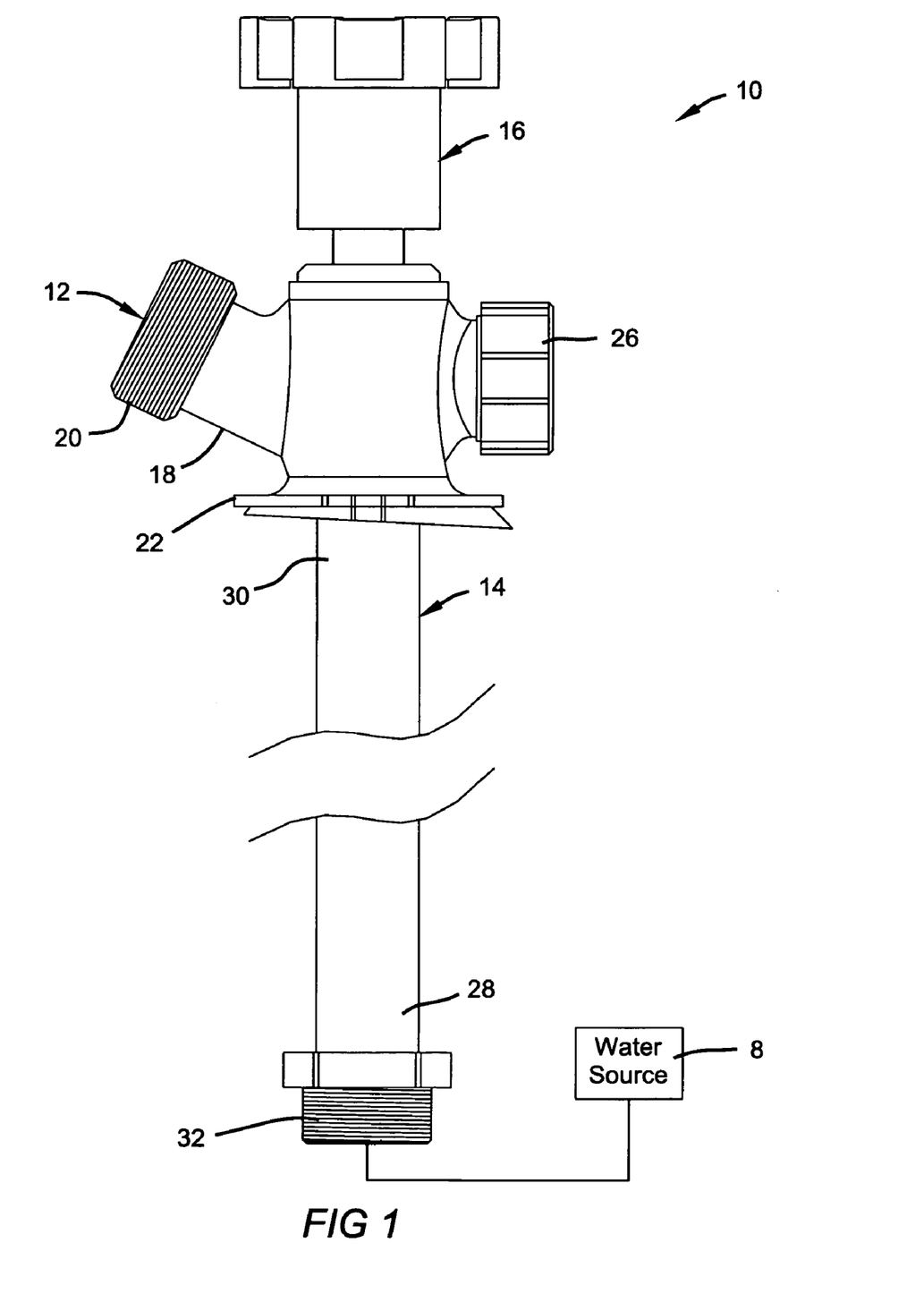
FIG. 1 is a side view of a frost free faucet assembly according to the present invention.

With reference to FIG. 1, the frost free faucet 10 includes a sill-cock or spigot assembly 12 coupled to a sleeve assembly 14. The spigot assembly 12 is further coupled to a handle assembly 16.

The spigot assembly 12 is a hollow, monolithic structure that is preferably cast of stainless steel chrome-plated brass or any other material known to one skilled in the art that is durable and can withstand extreme weather conditions. The spigot assembly 12 includes a drain conduit 18 with a threaded portion 20 for receiving a hose or any other device one may desire to attach to the frost free faucet assembly 10. The spigot assembly 12 also includes a flange member 22. The flange member 22 is used to secure the spigot assembly 12 to a wall or other barrier to which the frost free faucet assembly 10 is attached. Furthermore, the spigot assembly 12 includes a poppet housing 24 (FIG. 2) covered by a threaded cap 26. The poppet housing 24 encloses a poppet assembly 25 and o-ring 27 that function as a vacuum breaker.

The sleeve assembly 14 is a hollow pipe having an upstream portion 28 and a downstream portion 30. The downstream portion 30 is in fluid communication with the spigot assembly 12 and is secured to the spigot assembly 12 by welding, soldering, sweating, brazing, or the like. The upstream portion 28 includes threaded portion 32 so that the frost free faucet assembly can be connected to an inlet pipe (not shown) located within a structure such as a building. Alternatively, the upstream portion 28 may be adapted to fluidly couple to the inlet pipe by other conventional means.

The sleeve assembly 14 is preferably 8 to 24 inches in length, more preferably 10 to 18 inches in length, and most preferably 12 to 16 inches in length. It should be understood, however, that the sleeve assembly 14 can be any length so long as a valve assembly 24 (shown in FIG. 2), located within the upstream 28 portion of the sleeve assembly 14, is located within the wall or barrier of the dwelling so that the valve assembly is subjected to warmer temperatures so not to freeze.

Figure 2:
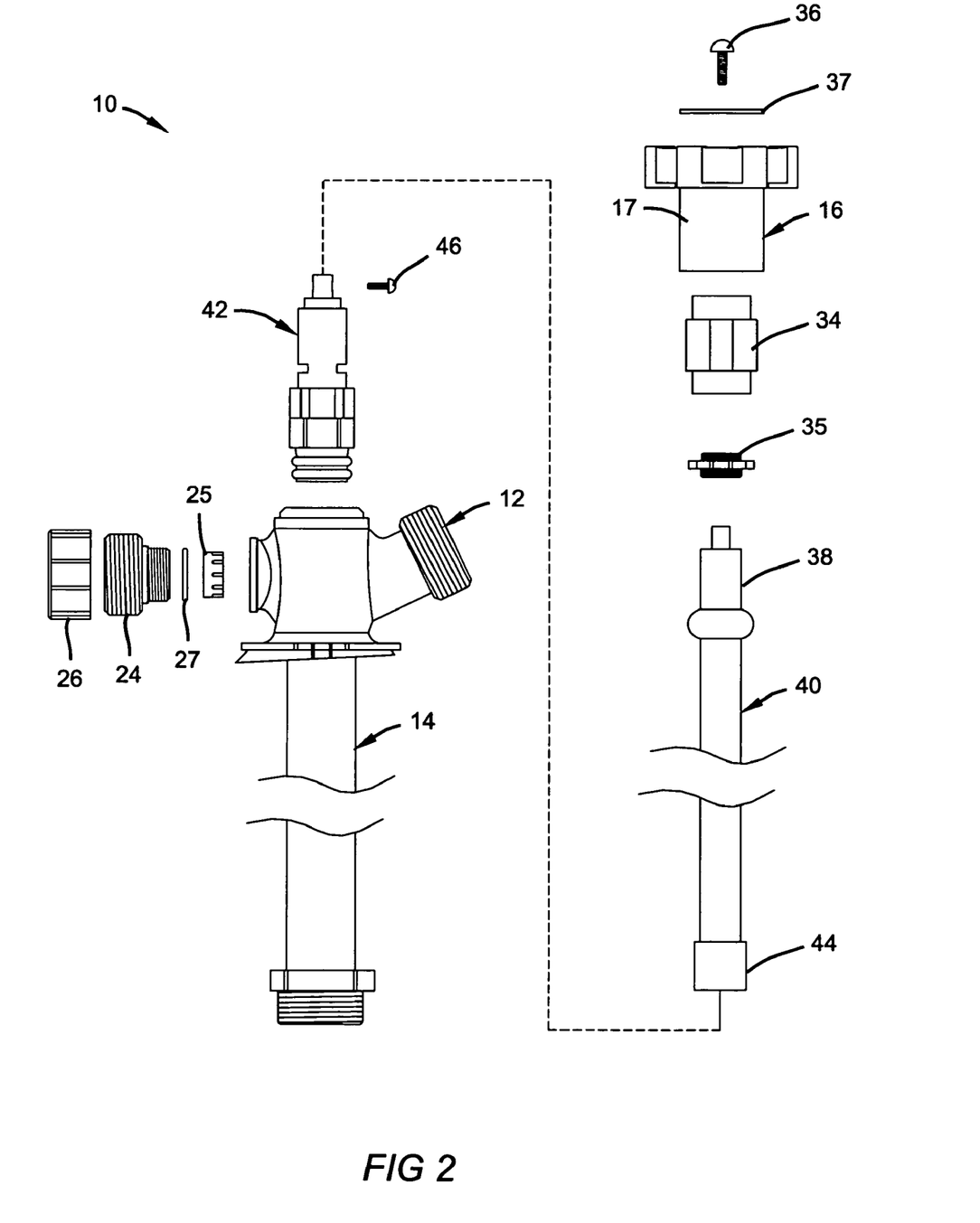
FIG. 2 is an exploded side view of the frost free faucet assembly shown in FIG. 1.

The handle assembly 16 may be any type of handle known in the art. It may be formed from metal, plastic, or any other material that is durable and is suitably strong to enable longevity in use of the frost free faucet assembly 10. As can be seen in FIG. 2, the handle assembly 16 comprises, and is connected to, a packing nut 34. A fastener 36 such as a screw, rivet, or the like is used to secure a name plate 37 and a handle 17 to the packing nut 34. The packing nut 34 secures the handle assembly 16 to the spigot assembly 12 and prevents water from leaking from the handle assembly 16 by way of a packing 35 that is formed of rubber, plastic, or other suitable sealing material. The packing nut 34 is a cylindrical piece and is hollow so as to receive an actuation portion 38 of a valve stem 40.

The valve stem 40 is located within the frost free faucet assembly 10, and more particularly, within the sleeve assembly 14 and spigot assembly 12. As the handle assembly 16 is connected to the packing nut 34, when the handle 17 is turned to an "on" or "off" position, an actuation portion 38 of the valve stem 40, and thus the entire valve stem 40, is also turned within the sleeve assembly 14 to actuate the valve assembly 42. The valve stem 40, in addition to the actuation portion 38, further includes a valve connection portion 44 that is used to connect the valve stem 40 to the valve assembly 42. The valve assembly 42 is secured to the valve connection portion 44 of the valve stem 40 by a fastener 46 such as a screw, rivet, or the like. The valve stem 40 and valve assembly 42 fit within the sleeve assembly 14.

Figure 3A:
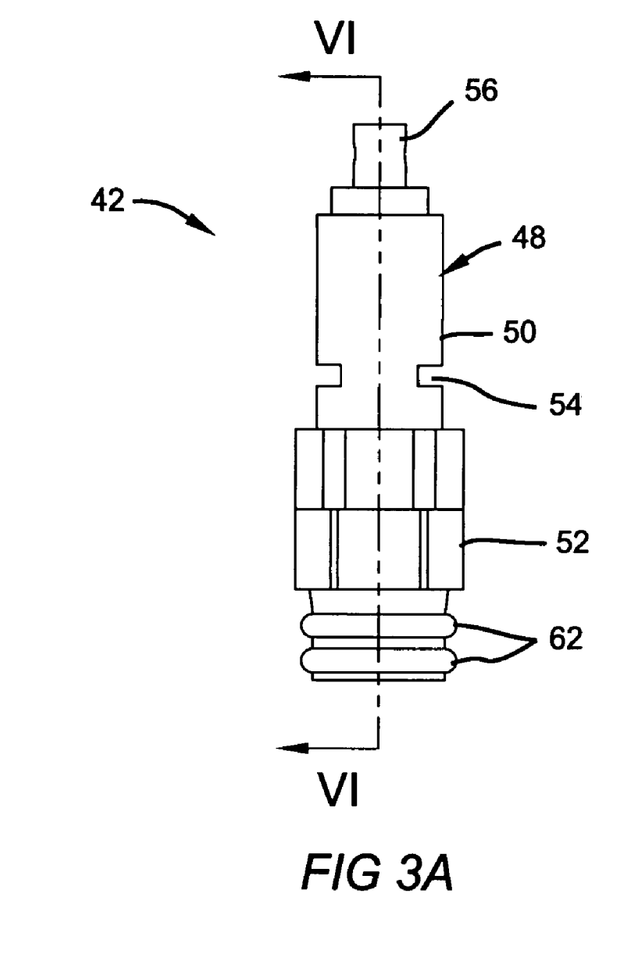
FIG. 3A and FIG. 3B are front side views of a valve cartridge for use in the frost free faucet assembly.
Figure 3B:
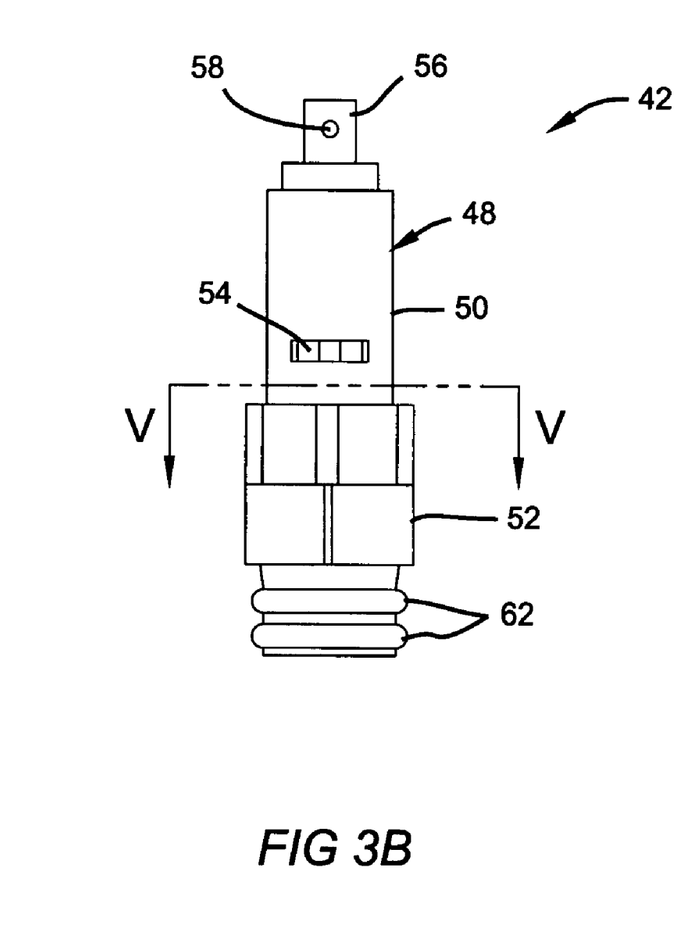
Figure 4:
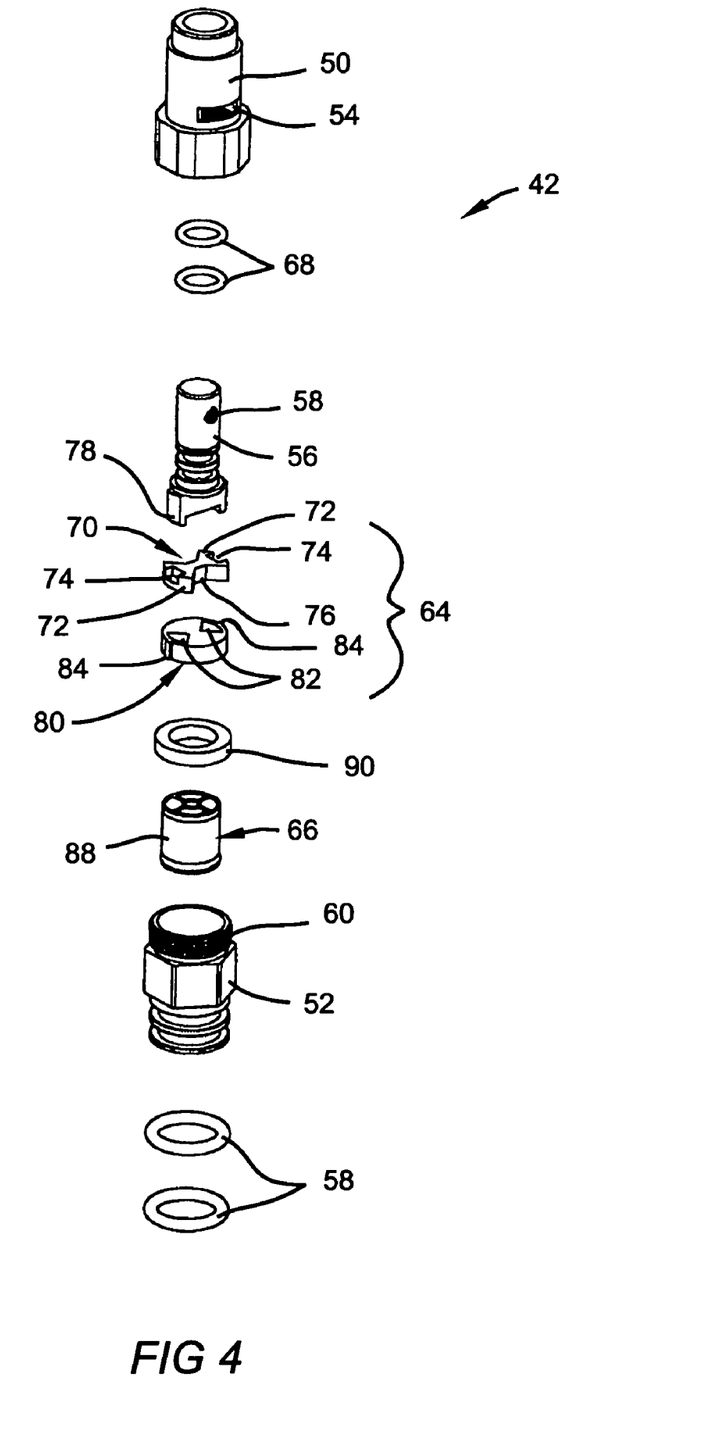
FIG. 4 is an exploded perspective view of the valve cartridge for use in the frost free faucet assembly shown in FIGS. 3A and 3B.

Now referring to FIGS. 3A, 3B, and 4, the valve assembly 42 will be described. As can be seen in FIG. 3A and 3B, the valve assembly 42 is formed of a housing or cartridge 48 that includes a valve shell 50 and a valve seat 52. The valve shell 50 is a cylindrical, hollow member that includes radial outlet ports 54. Preferably, the valve shell 50 is comprised of brass or any other suitable material that will not degrade during the lifetime of the frost free faucet assembly 10. More preferably, the valve shell 50 is formed of a material that will not chemically react with any elements that may be present in the water or fluid for which the valve conducts. The outlet ports 54 allow the water or any other fluid for which the valve is used to exit the valve cartridge 48 and travel downstream towards the spigot assembly 12. Also included in the cartridge 48 is an armature 56 that fits and is rotatably supported within the valve shell 50. The armature 56 is essentially an extension of the valve stem 40 that extends into the cartridge 48. The armature 56 is preferably formed of brass and includes a hole 58 for accepting the fastener 46 such as screw, rivet, or the like for securing the valve assembly 42 to the valve connection portion 44 of the valve stem 40.

The valve seat 52 is engaged with the valve shell 50, and is a hollow, cylindrical shaped member. The valve seat 52 is also preferably formed of brass. As with the valve shell 50, the valve seat 52 is also preferably formed of any other suitable material that will not degrade during the lifetime of the frost free faucet assembly 10 or chemically react with elements in the water or fluid. The valve seat 52 includes a threaded portion 60 (FIG. 4) used to releasably secure the valve seat 52 with the valve shell 50. The valve seat 52 also preferably includes o-rings 62. Although two o-rings 62 are shown in Figures, it should be understood that o-rings 62 are not required for the operation of the present invention. It is preferable, however, to include at least one o-ring 62 for further preventing any leaks from developing in the frost free faucet assembly 10.

Now referring to FIG. 4, the components of the cartridge 48 contained within the valve shell and valve seat 50 and 52 will now be described. The cartridge 48, in addition to the valve shell 50, valve seat 52, and armature 56 includes a valve member 64 and a check valve 66. The valve member 64 is disposed upstream and engaged with the armature 56 within the valve shell 50. Another pair of o-rings 68 provide a seal between the armature 56 and the valve shell 50. Although two o-rings 68 are shown the figure, it again should be understood that a single o-ring 68 is sufficient to provide an effective seal between the armature 56 and the valve shell 50.

The valve member 64 is a ¼ turn valve member having two valve elements 70 and 80. A rotatable element 70 is preferably a butterfly-shaped disc defined by two flanges 72 having recesses 74 formed therein. One skilled in the art, however, will recognize that the shape of rotatable element 70 may vary such as an element shape similar to stationary disc 80 or otherwise. The rotatable element or disc 70 further includes inlets 76 disposed adjacent the flanges 72. The recesses 74 of the rotatable element 70 engage with a pair of prongs 78 of the armature 56. The second element 80 of the valve member 64, is a stationary disc 80 having two through-holes 82. The stationary disc 80 includes a pair of bar members 84 that extend outward from the circumference of the stationary disc 80 and engage with indentations (not shown) located on an interior surface of the shell member 50. The bar members 84 engage the valve shell 50 to prevent rotation therein. The through-holes 82 of the stationary disc 80 coordinate with the inlets 76 of the rotatable disc 70 when the valve stem 40, armature 56, and thus the rotatable disc 70, are turned 90° relative to the stationary disc 80. The rotatable disc 70 is prevented from turning greater than 90° by stops 86 (FIGS. 5A and 5B) that are formed on the interior surface of the valve shell 50. More particularly, the stops 86 prevent the prongs 78 of armature 56 from turning greater than 90° within the valve shell 50.

The discs 70, 80 of the valve member 64 are preferably fabricated of a ceramic material. The use of a ceramic material is advantageous in that it is a relatively inert and strong material. As such, the discs 70 and 80 will not degrade over time due to elements that may be contained in the water or fluid that travels through the valve assembly 42. Furthermore, the ceramic material is scratch-resistant and prevents the discs from becoming damaged throughout the life of the frost free faucet 10. Although it is preferable to use a ceramic material in the present invention, it should be understood that the present invention contemplates the use of other materials. For example, the discs can be formed of a high-strength polymer, brass, stainless steel, or any other suitable material.

Figure 7:
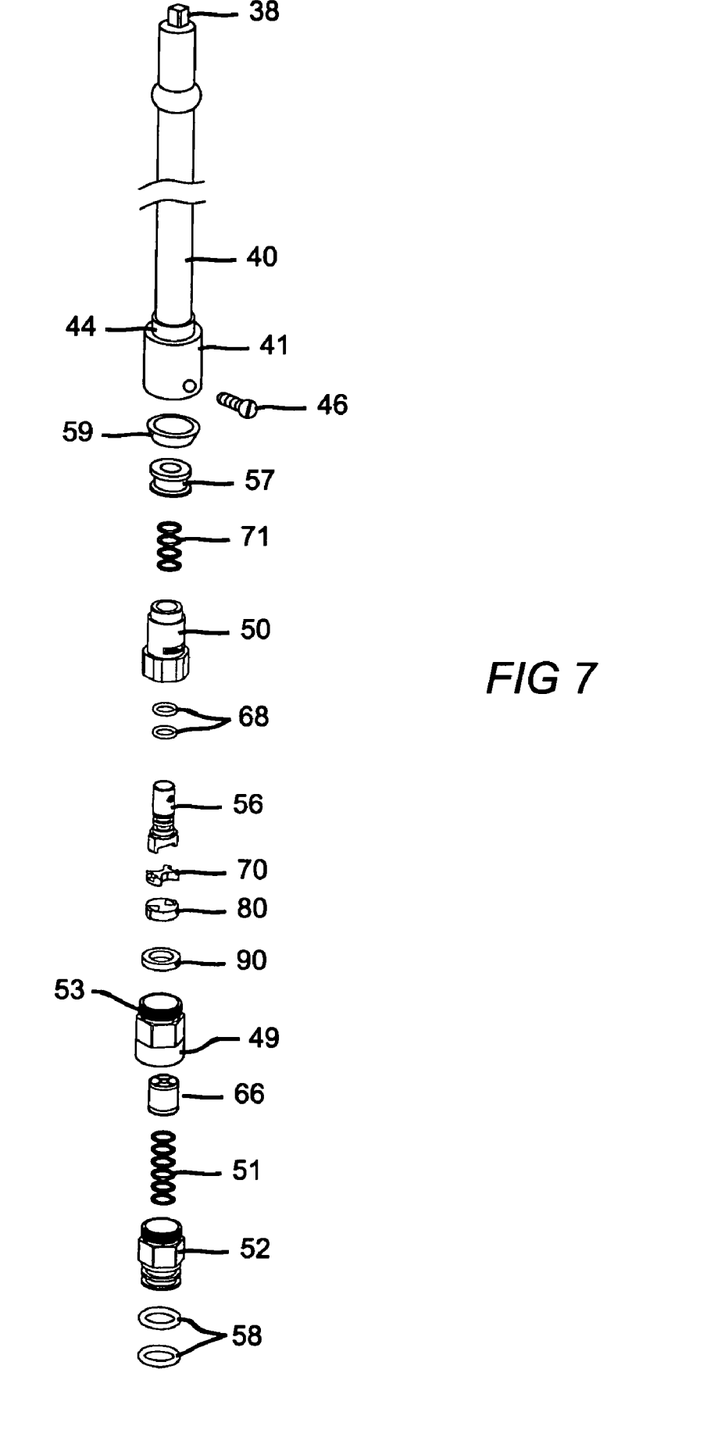
FIG. 7 is an exploded perspective view of the valve assembly according to another aspect of the present invention.
Figure 8:
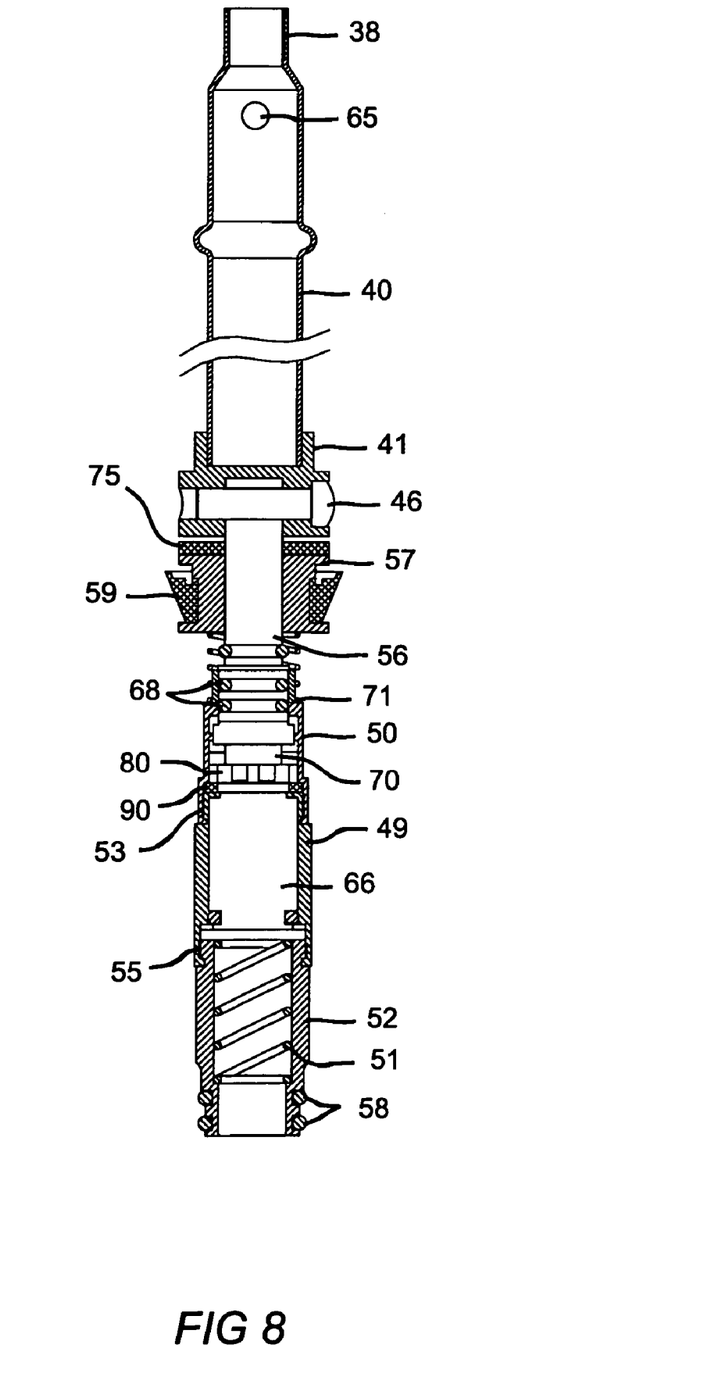
FIG. 8 is a cross-sectional view of the valve assembly shown in FIG. 7.

The check valve 66 is preferably a polymeric material or plastic such as polypropylene, polystyrene, or polyethylene and is disposed upstream of the valve member 64 (i.e., between the water source 8 and the valve member 64) within the valve seat 52 of the cartridge 48. Alternatively, the check valve 66 can be disposed within a check valve seat 49 that is disposed between the valve shell 50 and valve seat 52 (See FIGS. 7A and 7B). In this alternative embodiment, the check valve seat 49 is another cylindrical member that is formed of the same material (e.g., brass) as the valve shell 50 and valve seat 52. To connect the check valve seat 49 to the valve shell 50 and valve seat 52, the check valve seat 67 preferably includes a pair of threaded portions 53 and 55 that engage with the threaded portions of the valve shell 50 and valve seat 52. Otherwise, the check valve seat 49 can be connected to the valve seat 52 by welding, brazing, or the like. It should be understood that when utilizing a check valve seat 49, it may be desirable to include a spring 51 in the valve seat 52. This spring 51 supports the check valve 66 in the check valve seat 49, and prevents the check valve 66 from moving into the valve seat 52 when backpressure develops within the frost free faucet 10.

The check valve 66 includes a cylindrical member 88 and is separated from the valve member 64 by a washer 90 that is preferably formed from silicone or rubber. The check valve 66 further includes a spring 92 and a plunger 94 (shown in FIGS. 6A and 6B) that are actuated by the flow of water. An o-ring 95 surrounds the plunger 94 to prevent leaks when the plunger 94 and frost free faucet 10 are in a closed position. The check valve 66 is utilized for anti-siphoning and discharging backpressure. In preventing siphoning, the check valve 66 prevents water from flowing back through the valve assembly 42 and re-entering the water supply of the inlet pipe located within the building when a negative pressure differential exists across the plunger 94. As such, it is beneficial that the check valve 66 be placed upstream of the valve member 64.

Figure 5A:
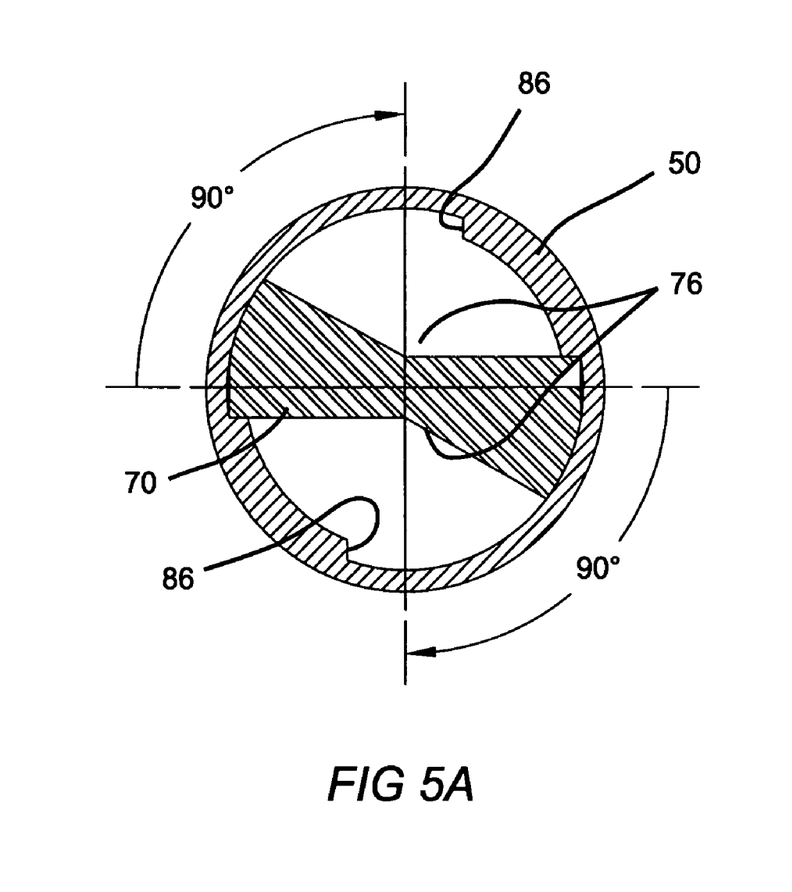
FIG. 5A and FIG. 5B are cross-sectional views the ¼ turn operation of the valve assembly taken through the line V—V shown in FIG. 3B.
Figure 5B:
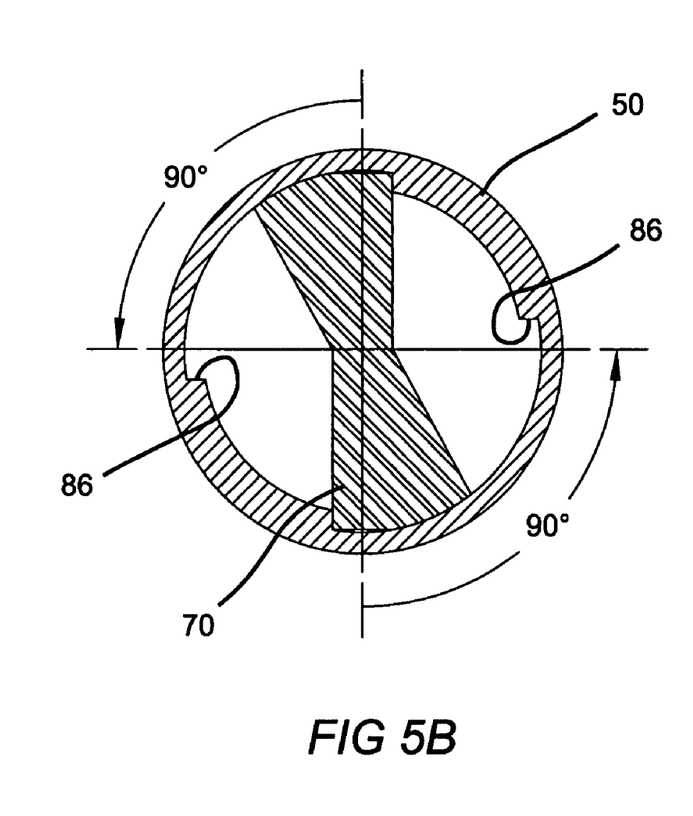

Operation of the frost-free faucet assembly 10 according to the present invention will now be described. In order to open the valve assembly 42, the handle 17 is turned in a first direction. As the valve member 64 is a ¼ valve, the handle 17 only undergoes a 90° of rotation to turn the valve member 64 to an open position. The handle 17 actuates the valve stem 40 and armature 56 to rotate the rotatable disc 70 of the valve member 64 a ¼ turn or 90°. This ¼ turn operation of the valve member 64 is shown in FIGS. 5A and 5B. When the rotatable disc 70 is rotated 90°, the inlets 76 of the rotatable disc 70 align with the through-holes 82 of the stationary disc 80 and allow water to flow through.

Figure 6A:
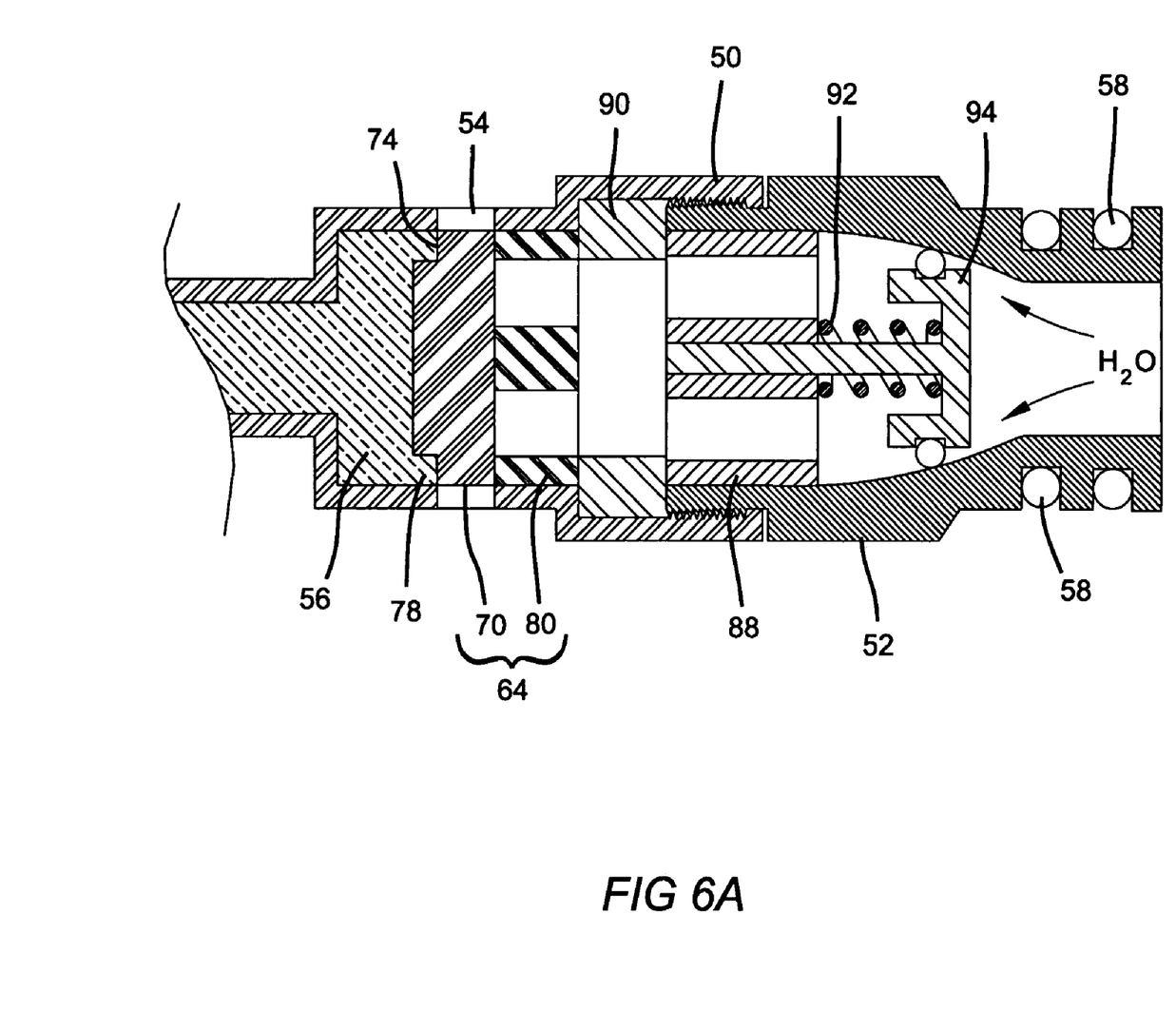
FIG. 6A and 6B are a cross-sectionals view of the valve cartridge taken through line VI—VI shown in FIG. 3A.

When the inlets 76 of the rotatable disc 70 are aligned with the through-holes 82, a positive pressure differential exists across the plunger 94. This positive pressure differential compresses the spring toward the cylindrical member 88 and actuates the plunger 94 to an open position (FIG. 6A). When the plunger 94 is in an open position the pressurized water from a water source 8 such as an inlet pipe located within the building is allowed to travel towards and through the check valve 66. The check valve 66 is preferably designed to accommodate water pressure of 120 psi or less, for use in residential or commercial applications. It should be understood, however, that the valve design of the present invention may be modified so that higher water pressures may be accommodated. More particularly, the components of the cartridge 48, valve member 64, and check valve 66 can be enlarged or strengthened to accommodate higher pressures.

The pressurized water travels through the open check valve 66 towards the ¼ turn valve member 64. The water flows through the aligned through-holes 82 and inlets 76 of the discs 70 and 80 and enters into the shell member 50 of the cartridge 48. The water then exits the shell member 50 of the cartridge 48 through the outlet ports 54 and enters the sleeve assembly 14. The water then flows around the valve stem 40 and through the sleeve member 14 downstream towards the spigot assembly 12 and exits from the drain conduit 20.

Figure 6B:
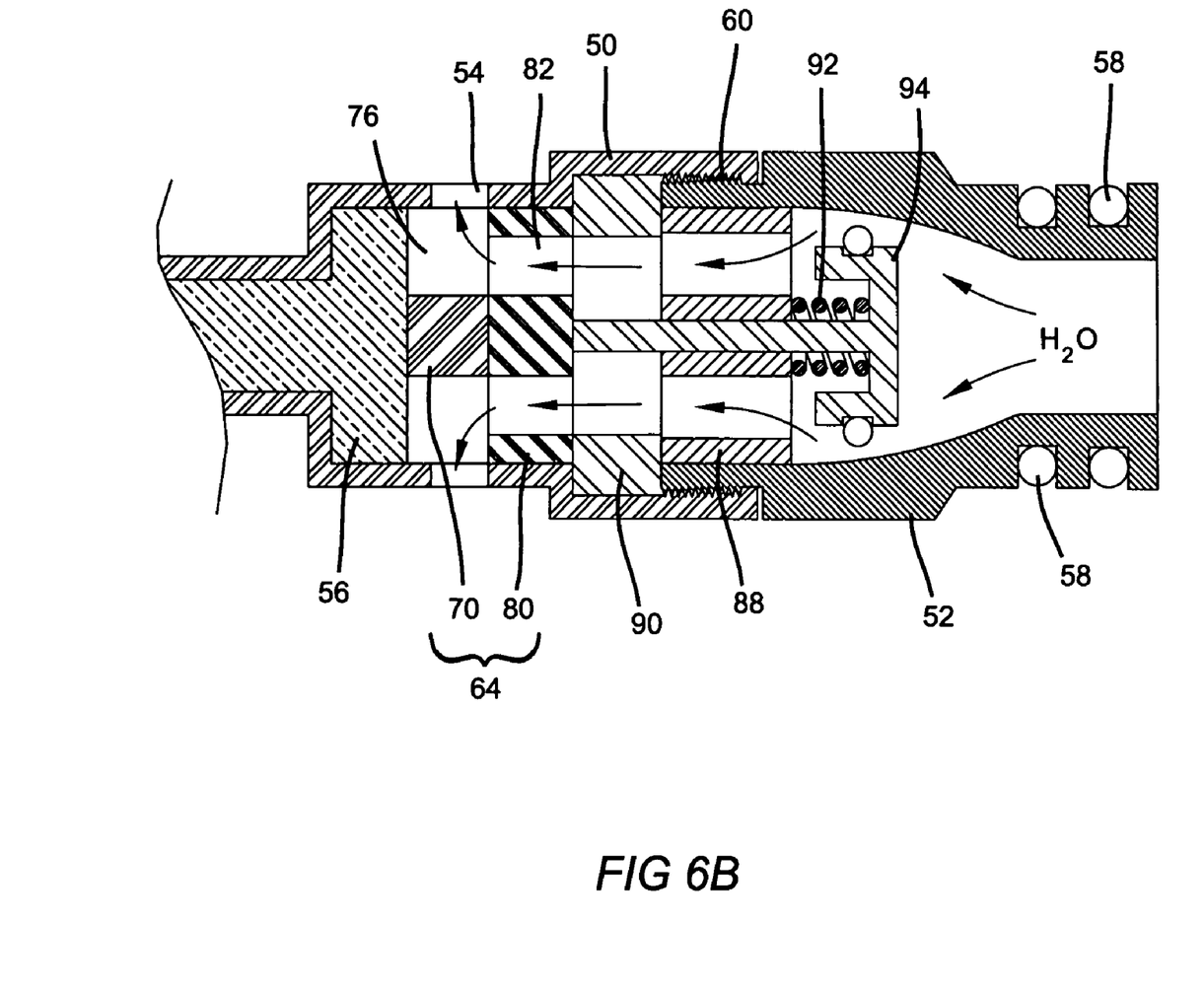

In order to close the valve assembly 42, and turn the frost free faucet 10 off, the handle 17 is turned a ¼ turn in a second and opposite direction. The handle 17 again actuates the valve stem 40 and armature 56 to rotate the rotatable disc 70 90° to a closed position. Referring to FIG. 6B, it can be seen that the inlets 76 of the rotatable disc 70 and the through-holes 82 of the stationary disc 80 become misaligned and prevent water from flowing through the ¼ turn valve 64. A backpressure or negative pressure differential then exists between the valve assembly 42 and the water source 8. This negative pressure differential allows the spring 92 to decompress which causes the plunger 94 of check valve 66 to "check" into a closed position and prevents the water still downstream of the valve cartridge 48 from siphoning back into the inlet pipe.

Figure 9:
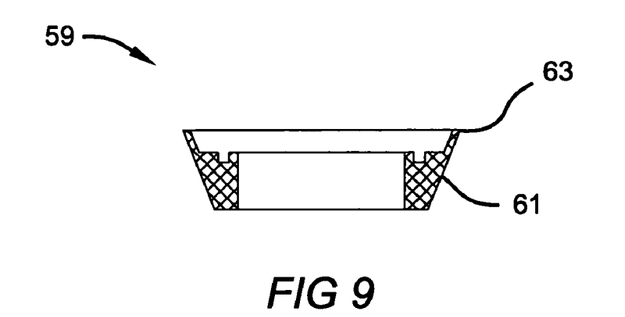
FIG. 9 is a cross sectional view of a U-packing according to a principle of the present invention.

In a variation of the present invention, shown in FIGS. 7–11, the valve stem 40 is in the form of a hollow tube with a connector 41 being formed at the valve connection portion 44 thereof. The connector 41 is formed of the same material as the valve stem 40 (e.g., brass) and is cylindrical in shape. Upstream of the connector 41 is a slider plate 57 including a U-packing 59. The slider plate 57 is slidably supported on the armature 56 for axial movement for sealing the conduit 65 formed through connector 41 as described below. The slider plate 57 is preferably formed of plastic or rubber. As shown in FIG. 9, the U-packing 59 is a cone or crown-shaped collar having a single sidewall 61 tapering or extending diagonally outwardly in a downstream direction. Preferably, the U-packing 59 is formed of rubber or is polymeric. The diameter of the U-packing 59 is preferably less than the diameter of the pipe of the sleeve assembly 14 such that a slight clearance exists between the edges 63 of the sidewalls 61 and an inner diameter of the pipe.

As stated above in the operation of the valve assembly 42, when the valve assembly 42 is in an open position, water exits the radial outlet ports 54 of the valve shell 50 and travels downstream towards the spigot 12. As the water travels downstream, the water contacts the U-packing 59 and displaces the U-packing 59 and slider plate 57 towards the connector 41. Once the slider plate 57 abuts the connector 41, the momentum of the water deflects the sidewalls 61 of the U-packing 59 radially inward so that the water flows towards the valve stem 40. This allows the water to continue to around the U-packing 59 downstream towards the spigot 12. Due to the U-packing 59, however, the flow of water around the U-packing 59 is slightly restricted and thus smoothed out, thereby reducing the amount of noise emitted by the frost-free faucet 10 in its open position. In this regard, it should be understood that the U-packing 59 does not need to be disposed on the slider plate 57, but may be disposed at any point downstream of the radial outlet ports 54 of the valve shell 50. More particularly, the U-packing 59 may be formed on a portion of the valve shell 50, the armature 56, or the valve stem 40 and still exhibit the function of smoothing out the flow of water to reduce the amount of noise generated during operation of the frost-free faucet 10.

The use of the slider plate 57 and U-packing 59 also assists in the relief of pressure downstream of the valve assembly 42. More particularly, during use of the frost-free faucet 10, it is common for a user to connect a hose with a nozzle to the spigot 12 to control the flow of water through the hose. As such, when both the valve assembly 42 and the nozzle is in a closed position, a pressure is created downstream of the valve assembly 42 (i.e. backpressure) that can stress the elements of the valve assembly 42 and frost-free faucet 10. Although the elements of the frost-free faucet 10 are designed to be resistant to typical levels of this backpressure, a problem can develop when the hose becomes crimped, is stepped on, driven over, etc. Specifically, this can result in an excessive amount of backpressure developing that may damage the elements of the valve assembly 42 or frost-free faucet 10.

Thus, the slider plate 57 functions to provide a pressure relief function. Specifically, when the backpressure is great enough, the U-packing 59 and slider plate 57 slide upstream back towards the armature 56. This relative sliding movement moves a seal 75 carried by The slider plate 57 to expose a conduit 65 fanned through the connector 41. One skilled in the art will recognize that the U-packing 59 should no; seal the downstream position 30 of the above assembly 14 to allow water situated between the slider plate 57 and the valve assembly to be displaced as the slider plate 57 moves upstream.

Figure 10A:
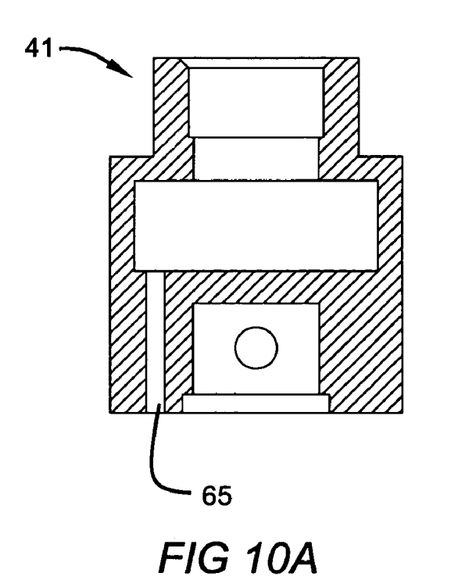
FIGS. 10A and 10B are a cross-sectional and bottom perspective view, respectively, of a connector according to a principle of the present invention.
Figure 10B:
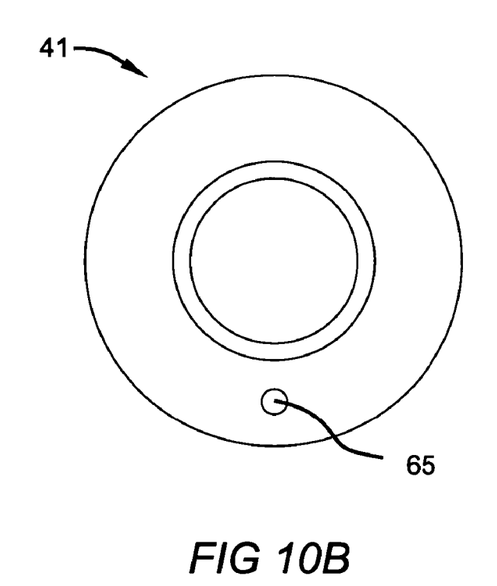
Figure 11:
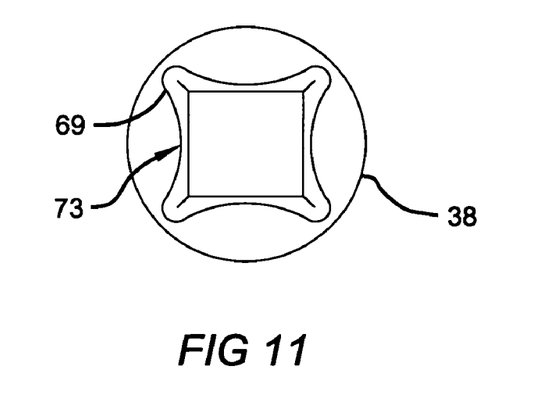
FIG. 11 is a top perspective view of a valve stem according to a principle of the present invention.

Referring to FIGS. 10A and 10B, it can be seen that the connector 41 includes a conduit 65 that is in fluid connection with the hollow valve stem 40. As the conduit 65 is exposed when the slider plate 57 is displaced upstream, a drain passageway is established from the downstream position 30 of the sleeve assembly 14 through the connector 41 via the conduit 65 and through the hollow valve stem 40. Water may either exit Through an exit port 65 of the valve stem 40 that is located within the handle 17, or may continue downstream through the valve stem 40 and exit through an opening in the handle 17 wherein the handle 17 is connected to the valve stem 40 by the fastener 36. In this regard, the water may exit through the handle 17 because the actuation portion 38 of the valve stem 40 tar is connected to the handle 17 has a non-circular square (or star shape 73) (See FIG. 11). Due to the non-circular shape 73 of the actuation portion 38 of the valve stem 40, however, water may travel through the lobes 69 around the fastener 36, and our of the handle 17. As such, backpressure that may develop in the frost free faucet 10 may be relieved by the leakage of the water through the handle 17.

A spring 71 may be provided between the slider plate 57 and the valve shell 50. In this manner, the slider plate 57 may only be displaced upstream by the backpressure of the water in the event that the force generated by pressure acting on the slider plate 57 and U-packing 59 is greater than the biasing force of the spring 71. In this regard, it is preferable that the spring 71 has a spring constant in the range of 0.025 to 0.075 N/mm, and most preferably about 0.05 N/mm. However, one skilled in the art will recognize that the spring rate may vary in accordance with the geometry of the slider plate 57. By including the spring 71 between the slider plate 57 and armature 56, the conduit 63 in the connector 41 will only be exposed in the event of extreme backpressure that may damage the frost free faucet 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A valve cartridge comprising:
   a valve housing having an inlet and an outlet;
   a valve member located within said valve housing and rotatably positionable through 90 degrees between a closed position and an open position to selectively enable fluid communication from said inlet to said outlet, said valve member including a first valve element and a second valve element rotatably positionable with respect to said first valve element, said first valve element having a first passageway formed therein which aligns with a second passageway formed in said second valve element when said valve member is in said open position, said second valve element blocking said first passageway when said valve member is in said closed position;
   an armature mechanically coupled to said second valve element for selectively actuating said second valve element;
   a slider plate slidably positionable on said armature; and
   a check valve located within said valve housing in fluid communication with said valve member.

2. The valve cartridge of claim 1, wherein said first valve element includes a first disc fixed within said valve housing and said second valve element includes a second disc rotatably positionable relative to said first disc within said valve housing.

3. The valve cartridge according to claim 1, further including a collar disposed on said armature.

4. The valve cartridge according to claim 1, further comprising a collar disposed on said slider plate.

5. A valve assembly comprising:
   a valve housing having an inlet and an outlet;
   a valve member located within said valve housing and rotatably positionable through 90 degrees between a closed position and an open position to selectively enable fluid communication from said inlet to said outlet, said valve member including a first valve element and a second valve element rotatably positionable with respect to said first valve element, said first valve element having a first passageway formed therein which aligns with a second passageway formed in said second valve element when said valve member is in said open position, said second valve element blocking said first passageway when said valve member is in said closed position;
   a collar including flexible sidewalls connected to said valve housing;
   a pressure relief mechanism which includes a drain passageway and is configured to drain through said valve assembly when said valve member is in said closed position.

6. The valve assembly according to claim 5, wherein said pressure relief mechanism includes a seal slidably positionable with respect to said valve member to expose said drain passageway.

7. A frost-free faucet comprising:
   a spigot disposed at a first end of an elongated pipe;
   a valve cartridge disposed at a second end of said elongated pipe, said valve assembly including a valve member located within a housing and rotatably positionable through 90 degrees between a closed position and an open position to selective enable fluid communication from an inlet to an outlet, said valve member including a first valve element and a second valve element rotatably positionable with respect to said first valve element, said first valve element having a first passageway formed therein which aligns with a second passageway formed in said second valve element when said valve member is in said open position, said second valve element blocking said first passageway when said valve member is in said closed position, and a check valve located in said valve housing between said inlet and said valve member to selectively disable fluid communication from said outlet to said inlet;

a valve stem extending from said first end mechanically coupled to said valve member such that said valve member is rotatably positionable by for rotating said valve stem; and a pressure relief mechanism which includes a drain passageway and is configured to drain through said valve assembly when said valve member is in said closed position.

8. The frost free faucet according to claim 7, further comprising a valve having a plunger including a seal formed thereon, said plunger being slidably positionable within said housing between a first position disabling fluid communication between said outlet and said inlet and a second position enabling fluid communication between said inlet and said outlet.

9. The frost free faucet according to claim 7, wherein said collar includes a diameter less than an inner diameter of said elongated pipe.

10. A frost free faucet comprising;

a spigot disposed at a first end of an elongated pipe;

a valve assembly disposed at a second end of said elongated pipe, said valve assembly including a valve member located within a housing and rotatably positionable through 90 degrees between a closed position and an open position to selective enable fluid communication from an inlet to an outlet, said valve member including a first valve element and a second valve element rotatably positionable with respect to said first valve element, said first valve element having a first passageway formed therein which aligns with a second passageway formed in said second valve element when said valve member is in said open position, said valve element blocking said first passageway when said valve member is in said closed position, and a check valve located in said valve housing between said inlet and said valve member to selectively disable fluid communication from said outlet to said inlet;

a valve stem disposed at a second end of said elongated pipe, such that said valve member is rotatably positionable by said valve stem, a slider plate including a collar with flexible sidewalls disposed on said valve stem, said slider pate being slidably positionable on said valve system; wherein said valve stem is hollow and includes a connector, said connector including a drain passageway in fluid communication with said hollow valve stem.

11. The frost free faucet according to claim 10, wherein said slider plate is disposed between connector and said valve member and selectively positionable to expose said drain passageway.

12. The frost free faucet according to claim 11, wherein when said valve member is in said open position, said slider plate slides toward said connector to block said conduit.

13. The frost free faucet according to claim 11, further comprising a spring disposed on said valve stem between said slider plate and said valve member.

14. The frost free faucet according to claim 10, wherein said valve stem includes an actuation portion driven by a handle, said actuation portion of said valve stem including non-circular configuration.

15. The frost free faucet according to claim 14, wherein said hollow valve stem, said conduit, and said actuation portion define said drain passageway out of said valve assembly, for discharging back pressure.

16. The frost free faucet according to claim 10, wherein said hollow valve stem includes at least one exit port.

17. The frost free faucet according to claim 16, wherein said hollow valve stem, said conduit, and said exit port of said valve stem define said drain passageway communication path out of said valve assembly for discharging backpressure.

* * * * *

UNITED STATES PATENT AND TRADEMARK OFFICE
CERTIFICATE OF CORRECTION

| | |
|---|---|
| PATENT NO. | : 7,140,390 B2 |
| APPLICATION NO. | : 11/049218 |
| DATED | : November 28, 2006 |
| INVENTOR(S) | : Berkman et al. |

It is certified that error appears in the above-identified patent and that said Letters Patent is hereby corrected as shown below:

Column 1, Line 37;
        After "use", delete "of".

Column 2, Line 26;
        "FIG. 6A and 6B" should be --FIGS. 6A and 6B--.

Column 2, Line 26;
        "a cross-sectionals view" should be --a cross-sectional views--.

Column 3, Line 47;
        "FIG. 3A and 3B" should be --FIGS. 3A and 3B--.

Column 4, Line 24;
        After "shown", insert --in--.

Column 6, Line 54;
        After "continue", delete "to".

Column 7, Line 21;
        "The" should be --the--.

Column 7, Line 22;
        "fanned" should be --formed--.

Column 7, Line 24;
        "no;" should be --not--.

Column 7, Line 24;
        "above" should be --sleeve--.

Column 7, Line 35;
        "Through" should be --through--.

Column 7, Line 41;
        "tar" should be --that--.

Column 7, Line 45;
        "our" should be --out--.

Column 8, Line 63, Claim 7;
        "selective" should be --selectively--.

UNITED STATES PATENT AND TRADEMARK OFFICE
CERTIFICATE OF CORRECTION

PATENT NO. : 7,140,390 B2
APPLICATION NO. : 11/049218
DATED : November 28, 2006
INVENTOR(S) : Berkman et al.

It is certified that error appears in the above-identified patent and that said Letters Patent is hereby corrected as shown below:

Column 9, Line 11, Claim 7;
    After "positionable", delete "by".

Column 9, Line 33, Claim 10;
    "selective" should be --selectively--.

Column 9, Line 40, Claim 10;
    After third occrrence of "said", insert --second--.

Column 10, Line 9, Claim 10;
    "pate" should be --plate--.

Column 10, Line 15, Claim 11;
    After "between", insert --said--.

Signed and Sealed this

Seventeenth Day of July, 2007

JON W. DUDAS
*Director of the United States Patent and Trademark Office*